(12) United States Patent
Han et al.

(10) Patent No.: US 11,719,969 B2
(45) Date of Patent: Aug. 8, 2023

(54) DISPLAY MODULE AND MANUFACTURING METHOD THEREFOR, AND DISPLAY APPARATUS

(71) Applicants: Beijing BOE Optoelectronics Technology Co., Ltd., Beijing (CN); BOE TECHNOLOGY GROUP CO., LTD., Beijing (CN)

(72) Inventors: Rui Han, Beijing (CN); Yue Zhai, Beijing (CN); Qing Ma, Beijing (CN); Zhipeng Zhang, Beijing (CN); Zeyuan Tong, Beijing (CN); Dong Cui, Beijing (CN); Wenyang Li, Beijing (CN); Zan Zhang, Beijing (CN); Shouyang Leng, Beijing (CN); Weining Chi, Beijing (CN); Fengping Wang, Beijing (CN); Rui Tan, Beijing (CN)

(73) Assignees: Beijing BOE Optoelectronics Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 103 days.

(21) Appl. No.: 17/296,614

(22) PCT Filed: Jul. 13, 2020

(86) PCT No.: PCT/CN2020/101648
§ 371 (c)(1),
(2) Date: May 25, 2021

(87) PCT Pub. No.: WO2021/017800
PCT Pub. Date: Feb. 4, 2021

(65) Prior Publication Data
US 2022/0004047 A1    Jan. 6, 2022

(30) Foreign Application Priority Data

Jul. 31, 2019   (CN) .......................... 201910699896.X

(51) Int. Cl.
*G02F 1/1333*   (2006.01)

(52) U.S. Cl.
CPC .... *G02F 1/133314* (2021.01); *G02F 1/13338* (2013.01); *G02F 1/133308* (2013.01);
(Continued)

(58) Field of Classification Search
CPC .......... G02F 2202/28; G02F 1/133331; G02F 1/133325; G02F 1/133314;
(Continued)

(56) References Cited

U.S. PATENT DOCUMENTS 9,964,811 B2   5/2018   Zhao et al.
10,133,100 B2   11/2018   Song et al.
(Continued)

FOREIGN PATENT DOCUMENTS

CN   104777678 A   7/2015
CN   106873207 A   6/2017
(Continued)

OTHER PUBLICATIONS

International Search Report and Written Opinion for International Application No. PCT/CN2020/101648 dated Oct. 21, 2020.

*Primary Examiner* — Jia X Pan
(74) *Attorney, Agent, or Firm* — Perilla Knox & Hildebrandt LLP; Kenneth A. Knox

(57) ABSTRACT

A display module is provided that includes a curved back panel including a bottom board and a side frame disposed on the bottom board; a display assembly located in an accommodation space enclosed by the side frame and the bottom board; a cover board located on a side, away from the bottom board, of the display assembly and supported by the side frame; and a bonding layer including a first bonding portion and a second bonding portion, which are located between the cover board and the side frame. Both the first bonding
(Continued)

portion and the second bonding portion are configured to bond the cover board to the side frame to enable the cover board to be curved. The second bonding portion has a smaller elasticity modulus than the first bonding portion. A method for manufacturing the display module, and a display apparatus are further provided.

18 Claims, 8 Drawing Sheets

(52) U.S. Cl.
CPC .. *G02F 1/133325* (2021.01); *G02F 1/133331* (2021.01); *G02F 2201/56* (2013.01); *G02F 2202/28* (2013.01)

(58) Field of Classification Search
CPC ......... G02F 1/133308; G02F 1/133305; G02F 2201/56; G02F 1/13338
See application file for complete search history.

(56) References Cited

U.S. PATENT DOCUMENTS

| | | | |
|---|---|---|---|
| 2011/0187960 A1* | 8/2011 | Kobayashi | G02F 1/1333 445/25 |
| 2012/0039091 A1* | 2/2012 | Lee | G06F 1/1637 362/633 |
| 2014/0118902 A1* | 5/2014 | Kim | G02F 1/133308 361/679.01 |
| 2017/0102568 A1 | 4/2017 | Zhao et al. | |
| 2017/0160580 A1* | 6/2017 | Song | G02B 6/0051 |
| 2019/0056624 A1* | 2/2019 | Zhang | G02F 1/133615 |

FOREIGN PATENT DOCUMENTS

| | | |
|---|---|---|
| CN | 107331795 A | 11/2017 |
| CN | 107331795 B | 2/2019 |
| CN | 210109507 U | 2/2020 |
| CN | 210803905 U | 6/2020 |
| EP | 3286602 A1 | 2/2018 |
| KR | 20180071608 A * | 6/2018 |
| KR | 20190053691 A | 5/2019 |
| WO | 2016169277 A1 | 10/2016 |

* cited by examiner

DISPLAY MODULE AND MANUFACTURING METHOD THEREFOR, AND DISPLAY APPARATUS

CROSS-REFERENCE TO RELATED APPLICATIONS

The present application is a national phase application under 35 U.S.C. § 371 of International Patent Application No. PCT/CN2020/101648 filed Jul. 13, 2020, which claims the benefit of and priority to Chinese Patent Application No. 201910699896.X filed on Jul. 31, 2019 the disclosures of which are incorporated by reference in their entireties herein.

TECHNICAL FIELD

The present disclosure relates to the field of display technologies and, in particular, to a display module, a manufacturing method thereof, and a display apparatus.

BACKGROUND

With the rapid development of liquid crystal display technologies, a liquid crystal display module is increasingly applied in various technical fields. For example, the liquid crystal display module may be used in a vehicle-mounted instrument and a central control display device. The vehicle-mounted instrument and the central control display device require the liquid crystal display module with characteristics of a large size, a curved surface, etc.

At present, double sided adhesive is used in a curved vehicle-mounted display device to fix a cover board to a back panel. However, since the back panel is in a curved state, that is, there are local protrusions or depressions on a sticking surface of the back panel, extra local stress is caused after the back panel is attached to the cover board, leading a serious Mura phenomenon. As a result, display effect of the product is reduced.

It should be noted that the information disclosed in the Background section above is only for enhancing the understanding of the background of the present disclosure, and thus may include information that does not constitute prior art known to those skilled in the art.

SUMMARY

Some embodiments of the present disclosure provide a display module, including: a curved back panel, including a bottom board and a side frame disposed on the bottom board; a display assembly, located in accommodation space enclosed by the side frame and the bottom board; a cover board, located on a side of the display assembly away from the bottom board and supported by the side frame; a bonding layer, including a first bonding portion located and a second bonding portion between the cover board and the side frame, where the first bonding portion located and the second bonding portion are both configured to bond the cover board to the side frame to enable the cover board to be curved, where, an elasticity modulus of the second bonding portion is smaller than that of the first bonding portion.

In some embodiments, the first bonding portion includes first solid glue and second solid glue disposed on the side frame, and the first solid glue and the second solid glue both extend along a circumferential direction of the cover board, and the first solid glue, the second solid glue and the side frame enclose an accommodation cavity; the second bonding portion includes liquid glue, and the liquid glue is filled in the accommodation cavity.

In some embodiments, the first solid glue and the second solid glue are spaced apart, and the first solid glue is closer to an outer wall surface of the side frame than the second solid glue, and the second solid glue is closer to an inner wall surface of the side frame than the first solid glue.

In some embodiments, both the first solid glue and the second solid glue are in a ring shape, and the first solid glue surrounds the second solid glue.

In some embodiments, a surface of the side frame in contact with the glue is provided with a groove.

In some embodiments, the first solid glue and the second solid glue are a substrate-free double sided adhesive, and the liquid glue is optical glue.

In some embodiments, the first bonding portion and the second bonding portion are both solid glue, the second bonding portion is disposed in a plurality of corner areas of the side frame, and the first bonding portion is disposed between any two adjacent corner areas and extends from one corner area of the any two adjacent corner areas to the other corner area of the any two adjacent corner areas.

In some embodiments, the first bonding portion is a substrate-free double sided adhesive, and the second bonding portion is a foam substrate double sided adhesive.

In some embodiments, an end of the first bonding portion close to the second bonding portion includes a first bump protruding toward the second bonding portion, and an end of the second bonding portion close to the first bonding portion includes a second bump protruding toward the first bonding portion, and the first bump and the second bump are configured to abut against each other in a width direction of the first bonding portion.

In some embodiments, the display module is curved.

In some embodiments, the display assembly includes a display panel and a touch panel bonded between the display panel and the cover board, and the display panel, the touch panel, and the cover board are all curved.

In some embodiments, a curvature of the back panel is same as that of the cover board.

In some embodiments, the side frame is detachably coupled to the bottom board.

Some embodiments of the present disclosure provide a display apparatus including the display module described in the foregoing embodiments.

Some embodiments of the present disclosure provide a manufacturing method of a display module, including: manufacture a curved back panel through a die-casting process, where the back panel includes a bottom board and a side frame disposed on the bottom board; performing a cold-bending process on a cover board to make a curved cover board; bonding the curved cover board to the side frame through a first bonding portion and a second bonding portion, where an elasticity modulus of the second bonding portion is smaller than that of the first bonding portion.

In some embodiments, the manufacturing method further includes: providing a display assembly, where the display assembly includes a display panel and a touch panel bonded to each other, and before the bonding the curved cover board to the side frame through the first bonding portion and the second bonding portion, the manufacturing method further includes: bonding the display panel and the touch panel bonded to each other to the cover board, where the touch panel is located between the display panel and the cover board; the cold-bending process is performed on the display panel, the touch panel and the cover board that are bonded together, to ensure all of the display panel, the touch panel and the cover board are curved.

In some embodiments, the manufacturing method further includes: providing a display assembly, where the display assembly includes a display panel and a touch panel bonded to each other, and after the bonding the curved cover board onto the side frame through the first bonding portion and the second bonding portion, the manufacturing method further includes: performing the cold-bending process on the display panel and the touch panel that are bonded to each other to enable both of the display panel and the touch panel to be curved; and bonding the curved display panel and the touch panel to the cover board, where the touch panel is located between the display panel and the cover board.

BRIEF DESCRIPTION OF THE DRAWINGS

The accompanying drawings, which are incorporated in the specification and constitute a part of the specification, show exemplary embodiments of the present disclosure. The drawings along with the specification explain the principles of the present disclosure. It is apparent that the drawings in the following description show only some of the embodiments of the present disclosure, and other drawings may be obtained by those skilled in the art without departing from the drawings described herein.

DETAILED DESCRIPTION

Figure 1:
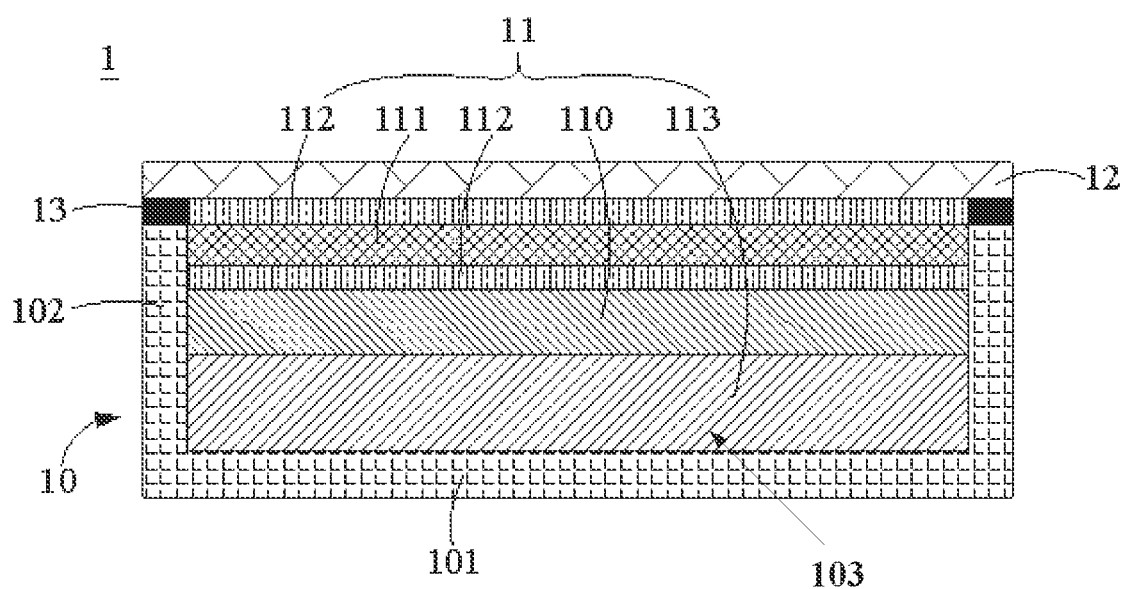
FIG. 1 shows a schematic cross-sectional structure diagram of a display module provided by some embodiments of the present disclosure.

Example embodiments will now be described more fully with reference to the accompanying drawings. However, the embodiments may be implemented in a variety of forms and should not be construed as being limited to the examples set forth herein; rather, these embodiments are provided so that the present disclosure will be more complete so as to convey the idea of the exemplary embodiments to those skilled in this art. The same reference numerals in the drawings denote the same or similar parts, and the repeated description thereof will be omitted.

Although the relative terms such as "above" and "below" are used in the specification to describe the relative relationship of one component to another component shown, these terms are only for convenience in this specification, for example, according to an exemplary direction shown in the drawings. It will be understood that if the device shown is flipped upside down, the component described as "above" will become a component "below" another component. When a structure is "on" another structure, it may mean that a structure is integrally formed on another structure, or that a structure is "directly" disposed on another structure, or that a structure is "indirectly" disposed on another structure through other structures.

The present disclosure provides a display module. The display module includes a back panel, a display assembly, a cover board, and a bonding layer. The back panel is curved, and the back panel includes a bottom board and a side frame disposed on the bottom board. The display assembly is located in an accommodation space enclosed by the side frame and the bottom board. The cover board is located on a side of the display assembly away from the bottom board, and is supported by the side frame. The bonding layer includes a first bonding portion and a second bonding portion located between the cover board and the side frame. The first bonding portion and the second bonding portion are both configured to bond the cover board to the side frame to enable the cover board to be curved, where an elasticity modulus of the second bonding portion is smaller than that of the first bonding portion.

Based on the above structure, a problem of poor curvature stability after full lamination of a vehicle-mounted curved module is improved. Further, a problem of a large stress on the display panel and serious Mura in four corners of the display panel after full lamination of the vehicle-mounted curved module is improved.

An embodiment of the present disclosure provides a display module 1. FIG. 1 shows a schematic cross-sectional structure diagram of a display module provided by some embodiments of the present disclosure. As shown in FIG. 1, the display module 1 may include a back panel 10, a display assembly 11, a cover board 12, and a bonding layer 13.

The back panel 10 may include a bottom board 101 and a side frame 102 disposed on the bottom board 101. The side frame 102 may be disposed at an edge of the bottom board 101. It should be understood that the side frame 102 is disposed along a circumferential direction of the cover board 101 and is, for example, in a ring shape. The side frame 102 and the bottom board 101 may enclose an accommodation space 103.

Optionally, the back panel 10 may be made of a metal material such as an aluminum board to ensure structural strength of the back panel 10, but it is not limited to this material, and may also be made of another material. When the back panel 10 is made of the metal material, the metal material may be processed by a die-casting process to form the back panel 10 and the back panel 10 is, for example, curved. In some embodiments, as shown in FIG. 1, the bottom board 101 and the side frame 102 disposed on the bottom board 101 are integrally formed. In another embodiment, the bottom board 101 and the side frame 102 disposed on the bottom board 101 may be detachable. The bottom board 101 and the side frame 102 may be formed by the die-casting process, and the bottom board 101 and the side frame 102 may be fixedly connected by fasteners to form the back panel 10.

The display assembly 11 may be installed in the accommodation space 103 of the back panel 10, that is, the display assembly 11 may be located within the side frame 102 and disposed on the bottom board 101. The display assembly 11 may include at least one of a display panel 110 and a touch panel 111. For example, the display assembly 11 includes both the display panel 110 and the touch panel 111, that is, the display assembly 11 not only has a display function, but also has a touch function. The display panel 110 may be a liquid crystal display panel, but is not limited thereto. It should be understood that when the display panel 110 is the liquid crystal display panel, the display assembly 11 may further include a backlight structure 113 to provide a light source for the liquid crystal display panel. The backlight structure 113 may be installed on the bottom board 101 and located between the display panel 110 and the bottom board 101. The backlight structure 113 is, for example, a direct type backlight structure 113. It should be noted that the backlight structure 113 shown in FIG. 1 is only a schematic diagram, and does not represent an actual backlight structure 113. The actual backlight structure 113 may include a light-emitting element, a bracket, an optical film, etc., which is not described in detail here.

The cover board 12 may be located on a side of the display assembly 11 away from the bottom board 101 and may be supported by the side frame 102 for sealing the accommodation space 103. For example, the cover board 12 may be made of a transparent glass material, that is, the cover board 12 may be a transparent glass board, but is not limited to this material, and may also be made of another transparent material.

The bonding layer 13 may be located between the side frame 102 and the cover board 12 to bond the cover board 12 and the side frame 102.

As shown in FIG. 1, the touch panel 111 is located between the display panel 110 and the cover board 12, and optical glue 112 is provided between the touch panel 111 and the display panel 110 for bonding the touch panel 111 and the display panel 110. Also, the optical glue 112 is also provided between the cover board 12 and the touch panel 111 for bonding the cover board 12 and the touch panel 111, so that the touch panel 111, the display panel 110, and the cover board 12 are bonded to form an integral structure. When the cover board 12 is bonded to the side frame 102 of the curved back panel 10, the touch panel 111, the display panel 110, and the cover board 12 are all curved.

Figure 2:
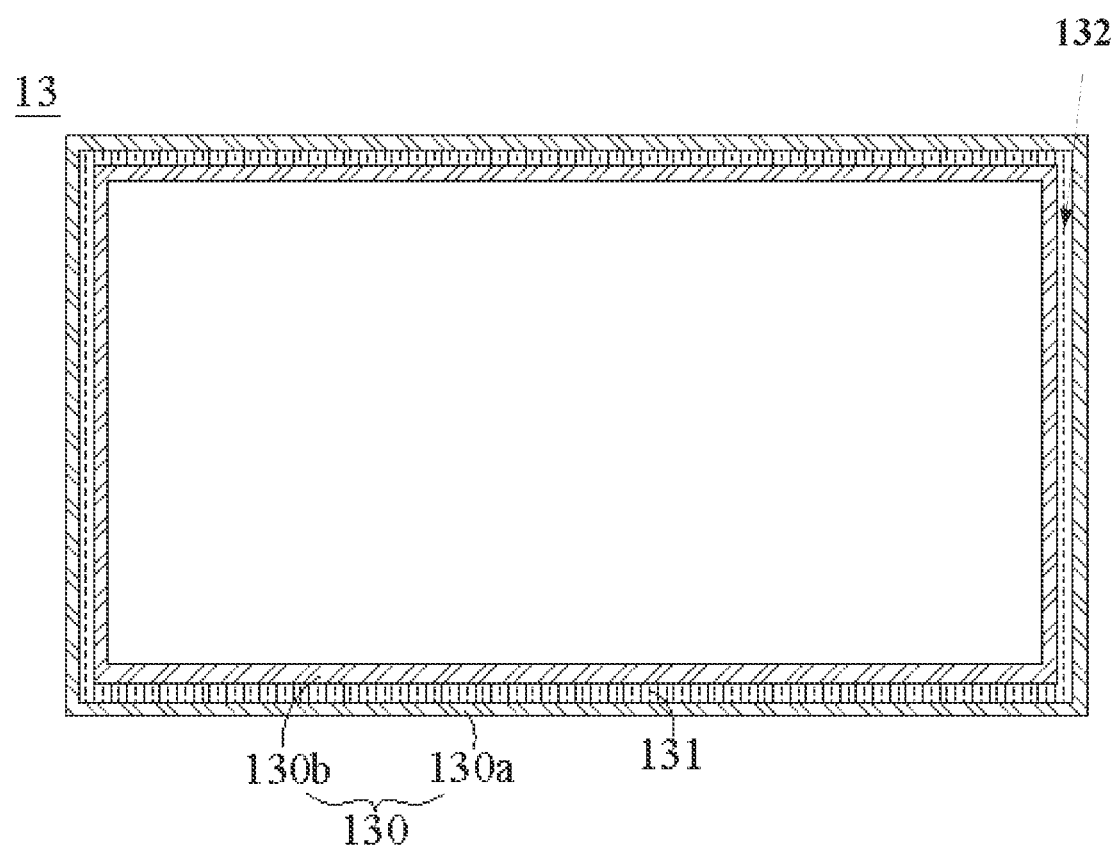
FIG. 2 shows a schematic structural diagram of a bonding layer in a display module provided by some embodiments of the present disclosure.
Figure 4:
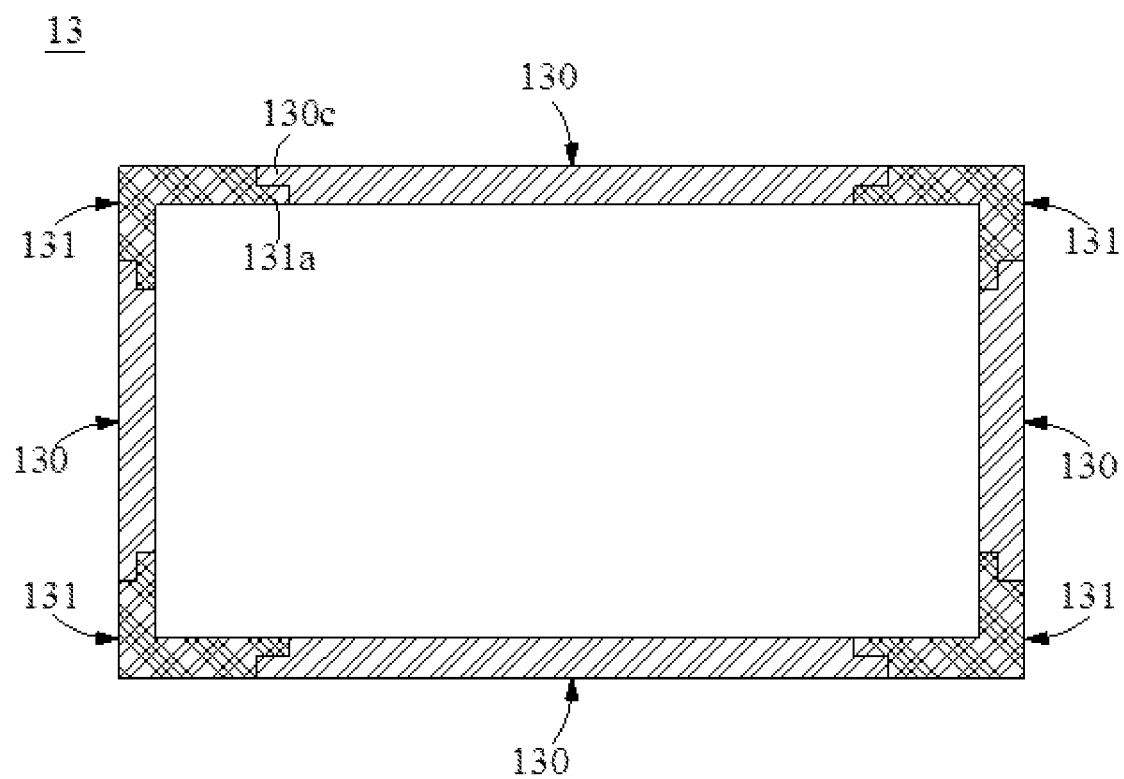
FIG. 4 shows a schematic structural diagram of a bonding layer in a display module provided by other embodiments of the present disclosure.

FIG. 2 shows a schematic structural diagram of a bonding layer in a display module provided by some embodiments of the present disclosure; and FIG. 4 shows a schematic structural diagram of a bonding layer in a display module provided by other embodiments of the present disclosure. Specifically, as shown in FIGS. 2 and 4, the bonding layer 13 may include a first bonding portion 130 and a second bonding portion 131, and both the first bonding portion 130 and the second bonding portion 131 are located between the cover board 12 and the side frame 102, and the first bonding portion 130 and the second bonding portion 131 both bond the cover board 12 and the side frame 102, that is, two opposite bonding surfaces of the first bonding portion 130 are bonded to the cover board 12 and the side frame 102, respectively. Two opposite bonding surfaces of the second bonding portion 131 are bonded to the cover board 12 and the side frame 102, respectively, so as to realize the bonding between the cover board 12 and the side frame 102.

An elasticity modulus of the second bonding portion 131 is smaller than that of the first bonding portion 130. By making a part of the structure of the bonding layer 13 with a material with a smaller elasticity modulus, a buffer ability of the bonding layer 13 may be increased to relieve an uneven stress between the cover board 12 and the back panel 10, so that a bending stress of the display panel 110 is relatively uniform, thereby improving the Mura phenomenon and improving the display effect.

In some embodiments, as shown in FIG. 2, liquid glue may be used as the second bonding portion 131 so as to increase the buffer ability of the bonding layer 13 to relieve the uneven stress between the cover board 12 and the back panel 10, thereby making the bending stress of the display panel 110 relatively uniform, and improving the Mura phenomenon. Moreover, the overall bonding strength of the bonding layer 13 is increased because the liquid glue has stronger bonding property than the solid glue, thereby ensuring the bonding stability between the cover board 12 and the side frame 102 of the back panel 10. It should be understood that the liquid glue has fluidity, thus if merely the liquid glue is used to bond the cover board 12 and the side frame 102 of the back panel 10, poor uniformity of the bonding thickness would be easily caused due to the curved surface stress, resulting in uneven bonding. In order to avoid this problem, the first bonding portion 130 of this embodiment may be made of solid glue (i.e., solid adhesive material), such as a double sided adhesive. The solid glue may be provided at an edge of the liquid glue to control a thickness of the liquid glue and play a role in sealing the liquid glue. Specifically, the first bonding portion 130 may include first solid glue 130a and second solid glue 130b disposed on the side frame 102, and the first solid glue 130a and the second solid glue 130b both extend along the circumferential direction of the cover board, and enclose an accommodation cavity 132 with the side frame 102. Also, the liquid glue may be filled in the accommodation cavity 132 to form the second bonding portion 131.

Figure 3:
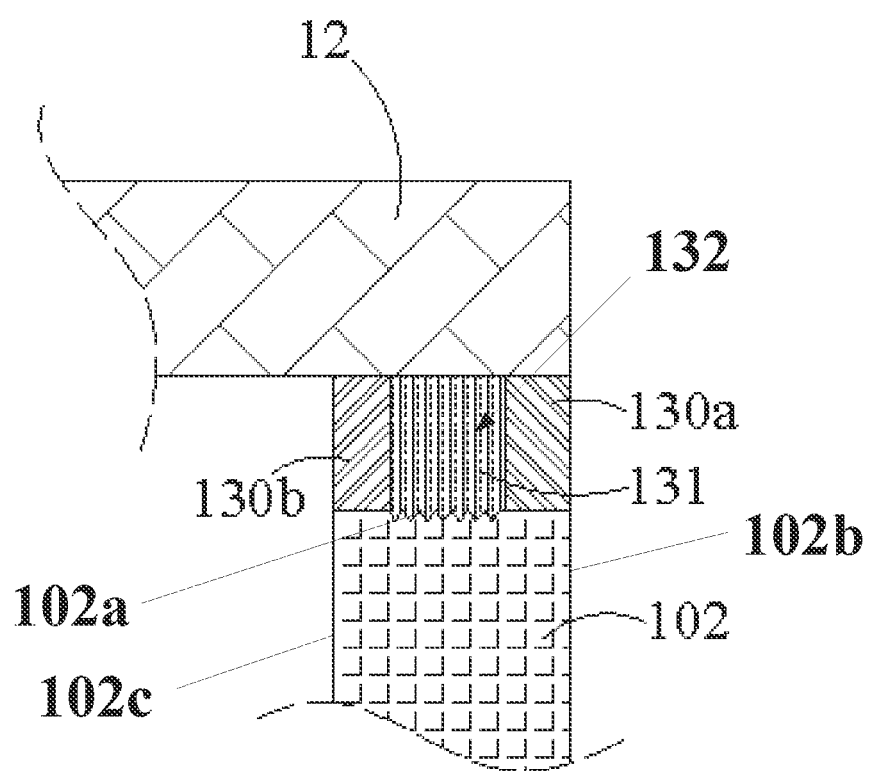
FIG. 3 shows a schematic partial cross-sectional structure diagram of a display module provided by some embodiments of the present disclosure.

In some embodiments, FIG. 3 shows a schematic partial cross-sectional structure diagram of a display module provided by some embodiments of the present disclosure. As shown in FIG. 3, a surface of the side frame 102 in contact with the liquid glue is provided with one or more grooves 102a. The number of grooves 102a may be one or more, which may increase a contact area between the liquid glue and the side frame 102, thereby increasing the bonding strength between the second bonding portion 131 and the side frame 102. In addition, it may also reduce the fluidity of the liquid glue to facilitate to ensure the uniformity of the glue thickness.

For example, the first solid glue 130a and the second solid glue 130b are spaced apart, and the first solid glue 130a is closer to an outer wall surface 102b of the side frame 102 than the second solid glue 130b, and the second solid glue 130b is closer to an inner wall surface 102c of the side frame 102 than the first solid glue 130a.

It should be understood that, in some embodiments, since the side frame 102 is in a ring shape, the bonding layer 13 is also in a ring shape as a whole. Specifically, as shown in FIG. 2 and FIG. 3, both the first solid glue 130a and the second solid glue 130b of the first bonding portion 130 are designed in a ring shape, and the second solid glue 130b is disposed around the first solid glue 130a. Since the first solid glue 130a and the second solid glue 130b of the first bonding portion 130 are designed in a ring shape, the accommodation cavity 102a enclosed by the first solid glue 130a, the second solid glue 130b and the side frame 102 is also in a ring shape, so that the second bonding portion 131 is also in a ring shape as a whole, and this design makes the buffer ability of the bonding layer 13 in the entire ring-shaped direction strengthened.

In some embodiments, an orthographic projection of the bonding layer 13 on the bottom board 101 may coincide with an orthographic projection of the side frame 102 on the bottom board 101, that is, the inner wall surface of the first solid glue 130b away from the second solid glue 130a is coplanar with the inner wall surface 102c of the side frame 102, and the outer wall surface of the first solid glue 130a away from the second solid glue 130b is coplanar with the outer wall surface of the side frame 102, to ensure the texture of the entire display module 1 and the bonding stability between the cover board 12 and the side frame 102 of the back panel 10.

For example, the first solid glue 130a and the second solid glue 130b may be a substrate-free double sided adhesive tape. The substrate-free double sided adhesive tape is directly formed by coating and pressing acrylic glue. The tape is transparent and has excellent adhesion effect to ensure the adhesion stability between the cover board 12 and the back panel 10. In addition, the substrate-free double sided adhesive tape also has good waterproof performance. The liquid glue may be optical glue, which has a low elasticity modulus, thereby further improving the buffer performance of the second bonding portion 131, and then increasing the buffer performance of the entire bonding layer 13 to relieve the uneven stress between the cover board 12 and the back panel 10, so that the bending stress of the display panel 110 is relatively uniform, so as to improve the Mura phenomenon.

In other embodiments, as shown in FIG. 4, the first bonding portion 130 and the second bonding portion 131 may both be solid glue (that is, made of a solid bonding material), and such design has a low requirement for a clamp for attachment, and thickness uniformity of the first bonding portion 130 and the second bonding portion 131 may be ensured after the attachment is completed. For example, the first bonding portion 130 may be a substrate-free double sided adhesive, which has an excellent bonding effect to ensure the bonding stability between the cover board 12 and the back panel 10; the second bonding portion 131 may be a foam substrate double sided adhesive, which refers to a structure in which a strong acrylic adhesive is coated on both surfaces of the foamed foam substrate. The foam substrate double sided adhesive has a small elasticity modulus and thus has better buffer performance, so as to alleviate the uneven stress between the cover board 12 and the back panel 10, which further making the bending stress of the display panel 110 relatively uniform to improve the Mura phenomenon.

It should be noted that when the display module 1 is substantially rectangular, the Mura phenomenon at its four corners is more serious. Therefore, in order to improve the serious Mura phenomenon at the four corners, as shown in FIG. 4, in this embodiment, the second bonding portion 131 may be disposed in the corner areas of the side frame 102, and the first bonding portion 130 may be disposed in an area of the side frame 102 other than the corner areas, that is, between any two adjacent corner areas. In addition, the first bonding portion 130 extends from one corner area of the any two adjacent corner areas to the other corner area of the any two adjacent corner areas, which not only ensures the bonding stability between the cover board 12 and the side frame 102 of the back panel 10, to avoid a situation in which the cover board 12 falls off the side frame 102 of the back panel 10 during the vibration process to improve product reliability; it may also increase the buffer performance at the corners, thereby improving the serious Mura phenomenon at the corners.

It should be understood that this embodiment is not only applicable to the rectangular panel, but also applicable to panels of other shapes. The essence of this embodiment is to bond the cover board 12 and the side frame 102 of the back panel 10 through the foam substrate double sided adhesive with a small elasticity modulus in an area between where the Mura phenomenon is serious, and bond them through the substrate-free double sided adhesive tape with a high bonding performance in other areas.

In some embodiments, the first bonding portion 130 and the second bonding portion 131 are made of solid bonding materials, and a surface where the first bonding portion 130 abuts against the second bonding portion 131 may be a stepped surface, that is, a surface of the first bonding portion 130 that abuts against the second bonding portion 131 and a surface of the second bonding portion 131 that abuts against the first bonding portion 130 are both stepped surfaces. These stepped surfaces may be formed by local protrusions or depressions. Specifically, as shown in FIG. 4, an end of the first bonding portion 130 close to the second bonding portion 131 may have a first bump 130c, and an end of the second bonding portion 131 close to the first bonding portion 130 may have a second bump 131a. The first bump 130c and the second bump 131a abut against each other in a width direction of the first bonding portion 130, for example, are in seamless contact. Specifically, in a direction from the inner wall surface 102a to the outer wall surface 102b of the side frame 102, the first bump 130c and the second bump 131a are disposed adjacent to each other. In this embodiment, by making the abutting surfaces between the first bonding portion 130 and the second bonding portion 131 to be a stepped surface, it is possible to prevent foreign matter (such as dust, water and oxygen, etc.) from entering the accommodation space 103 enclosed by the side frame 102, thereby ensuring a service life of the display module 1. In addition, the location fit of the first bonding portion 130 and the second bonding portion 131 may also be achieved.

Figure 5:
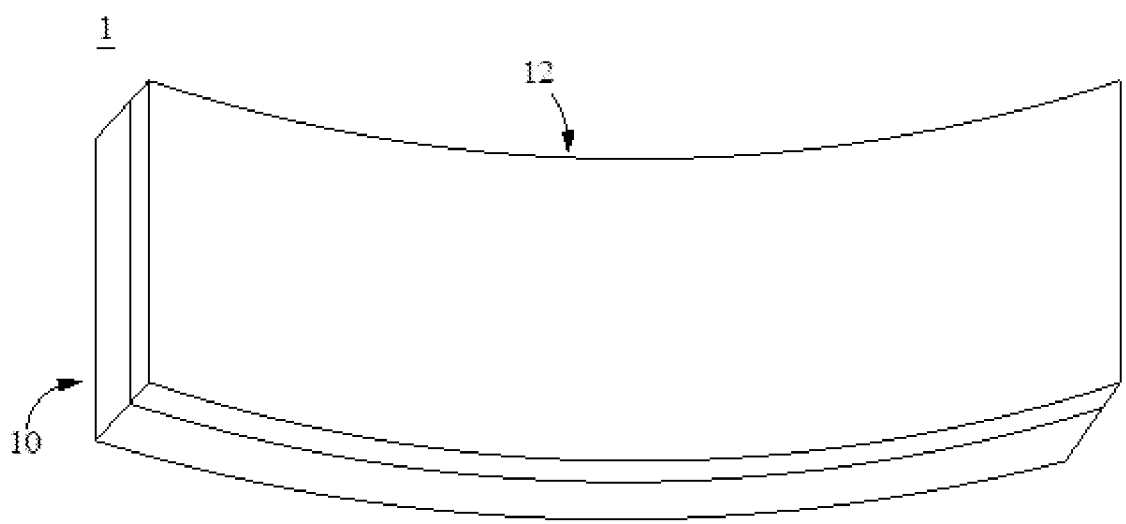
FIG. 5 shows a schematic structural diagram of a curved display module according to an embodiment of the present disclosure.

In an embodiment, FIG. 5 shows a schematic structural diagram of a curved display module according to an embodiment of the present disclosure. As shown in FIG. 5, since the back panel 10 is curved, the assembled display module 1 is also curved, that is, the cover board 12, the display assembly 11, and the back panel 10 of the display module 1 are all curved, so as to be assembled into a curved display module 1. For example, the curved display module 1 may be applied to a vehicle-mounted display device, such as a vehicle-mounted instrument and a central control display device, but is not limited to this.

Figure 6:
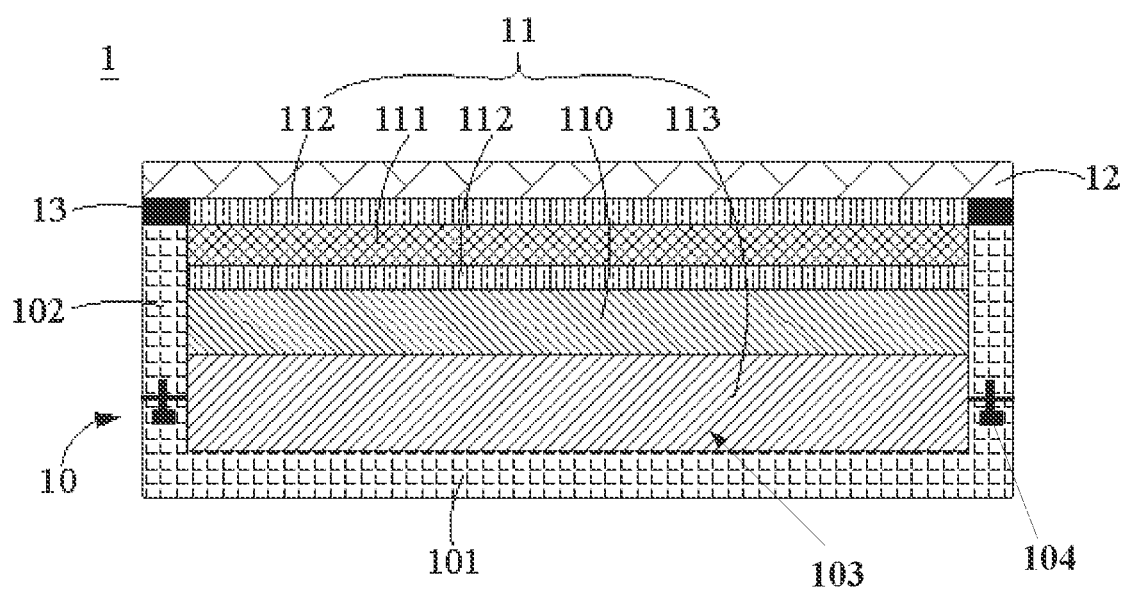
FIG. 6 shows a schematic cross-sectional structure diagram of a display module provided by other embodiments of the present disclosure.

The display panel 110, the touch panel 111 in the display assembly 11, and the cover board 12 may all be curved. Specifically, in some embodiments, the display panel 110, the touch panel 111, and the cover board 12 are sequentially bonded in a flat state to form a first flat panel structure; the first flat panel structure is subjected to a cold-bending process to be curved, and then is attached to the side frame 102 of the back panel 10. Such design may ensure that the display panel 110, the touch panel 111 and the cover board 12 have a same curvature, and may also ensure the bonding yield and the stability between the display panel 110, the touch panel 111 and the cover board 12, thereby relieving the Mura problem caused by flatness. In some embodiments, the cold-bending process may also first performed on the cover board 12 to make it curved, and then the curved cover board 12 is attached to the side frame 102 of the back panel 10, and the display panel 110 and the touch panel 111 are bonded in a flat panel state to form a second flat panel structure, and the cold-bending process may performed on the second flat panel structure to make it curved, and the curved second structure is attached to the curved cover board 12. In this embodiment, the side frame 102 and the bottom board 101 of the back panel 10 are required to be separate structures. FIG. 6 shows a schematic cross-sectional structure diagram of a display module provided by other embodiments of the present disclosure. As shown in FIG. 6, the side frame 102 and the bottom board 101 of the back panel 10 are separate structures, and the side frame 102 and the bottom board 101 may be detachably connected by a fastener 104. The assembly of the side frame 102 and the bottom board 101 may be performed after the curved second structure is attached to the curved cover board 12.

In addition, in some embodiments of the present disclosure, the cold bending process is used to curve the first flat panel structure formed by the display panel 110, the touch panel 111, and the cover board 12, so as to facilitate processing into a curved structure with a specific curvature, and the curved state is maintained well. That is, the curvature remains stable, which may further improve the serious Mura phenomenon. It should be noted that the cold-bending process in this embodiment refers to a method for shaping a sheet in a curved state, that is, a clamp is used to mechanically bend the sheet into a shaped sheet with a certain shape and size at room temperature.

In some embodiments, the touch panel 111 and the cover board 12 are bonded together in a form of whole-surface attachment, that is, the optical glue 112 between the touch panel 111 and the cover board 12 is surface glue, and an area of the surface glue is substantially equal to that of the touch panel 111. Compared with a frame attachment manner (that is, the optical glue 112 between the touch panel 111 and the cover board 12 is frame glue, which is only provided on the edge area of the touch panel 111), in the whole-surface attachment, there is no air between the touch panel 111 and the cover board 12, which may avoid an influence of air on the display effect. The display panel 110 and the touch panel 111 are also bonded together in the form of whole-surface attachment.

Since the display panel 110, the touch panel 111, and the cover board 12 are curved and deformed together, a certain resilience will be generated, which may cause the Mura phenomenon to a certain degree. Therefore, in order to improve the Mura phenomenon generated in this solution, a backlight structure 113 in the display assembly 11 may be designed for partial backlight adjustment. Hundreds of LEDs (light emitting diodes) are used to form a backlight source. Each LED in the backlight source may be adjusted according to the brightness and darkness of the displayed image, so that the brightness of the LED corresponding to the highlighted part of the displayed image may be maximum, while the brightness of the LED corresponding to the dark part may be reduced, or even turned off to achieve the best contrast.

The back panel 10 may be shaped in a curved state through the die-casting process to facilitate processing into a curved structure with a specific curvature. A curvature of the back panel 10 is the same as a curvature of the cover board 12 to ensure the attachment yield and stability of the back panel 10 and the cover board 12, thereby improving the serious Mura phenomenon.

Figure 7:
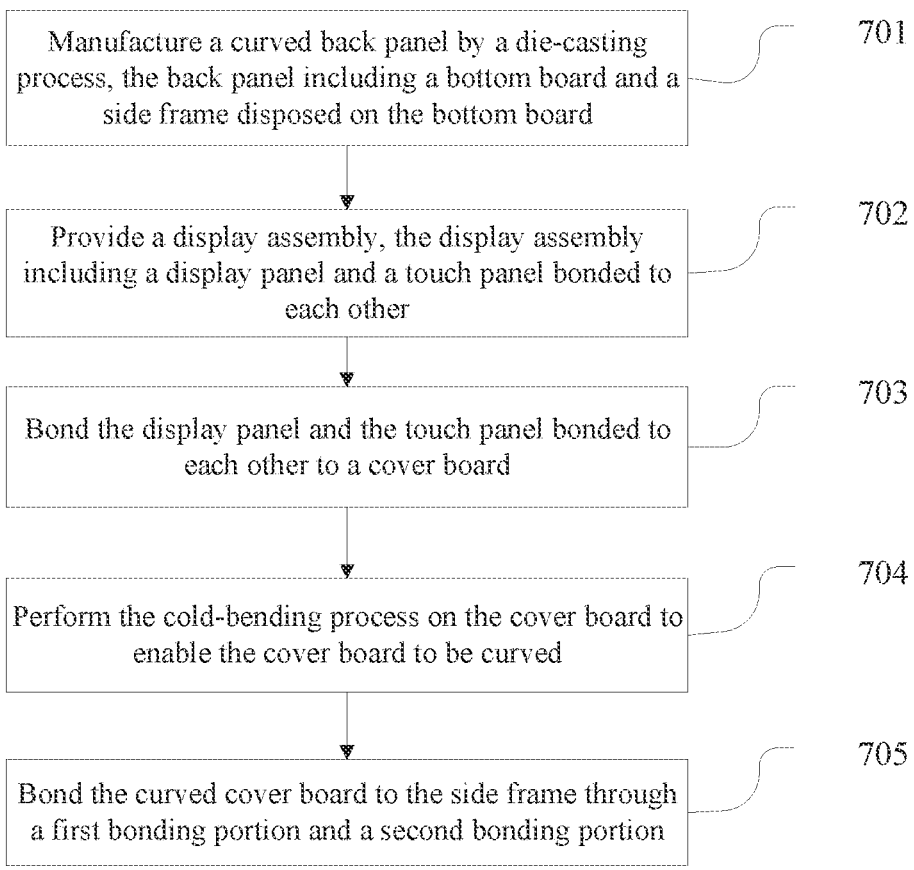
FIG. 7 shows a flowchart of a method of manufacturing a display module provided by some embodiments of the present disclosure.

Some embodiments of the present disclosure also provide a manufacturing method of a display module. FIG. 7 shows a flowchart of a manufacturing method of a display module provided by some embodiments of the present disclosure. A manufacturing method of a curved display module 1 may include the following steps:

in step 701, a die-casting process is adopted to manufacture a curved back panel, and the back panel includes a bottom board and a side frame disposed on the bottom board;

in step 702, a display assembly is provided, and the display assembly including a display panel and a touch panel bonded to each other;

in step 703, the display panel and the touch panel bonded to each other are bonded to a cover board;

in step 704, a cold-bending process is performed on the cover board to enable the cover board to be curved; and in step 705, the curved cover board is bonded to the side frame through a first bonding portion and a second bonding portion.

In step 701, the curved back panel 10 is manufactured by using the die-casting process, and the bottom board 101 and the side frame 102 of the back panel 10 are integrally formed, for example.

In step 702, the optical glue 112 is used to bond the display panel 110 and the touch panel 111 in a flat state into an integral structure.

In step 703, the display panel 110 and the touch panel 111 which are bonded to each other are bonded to the cover board 12 by using the optical glue 112 to form a first flat panel structure, where the touch panel 111 is located between the display panel 110 and the cover board 12.

In step 704, a clamp is used to perform the cold-bending process on the first flat panel structure, to enable the first flat panel structure including the cover board 12 to be curved, and a curvature of the cover board 12 matches that of the back panel 10.

In step 705, the first bonding portion 130 and the second bonding portion 131 are used to bond the cover board 13 to the side frame 102 of the back panel 10, and the elasticity modulus of the second bonding portion 131 is smaller than that of the first bonding portion 130.

Figure 8:
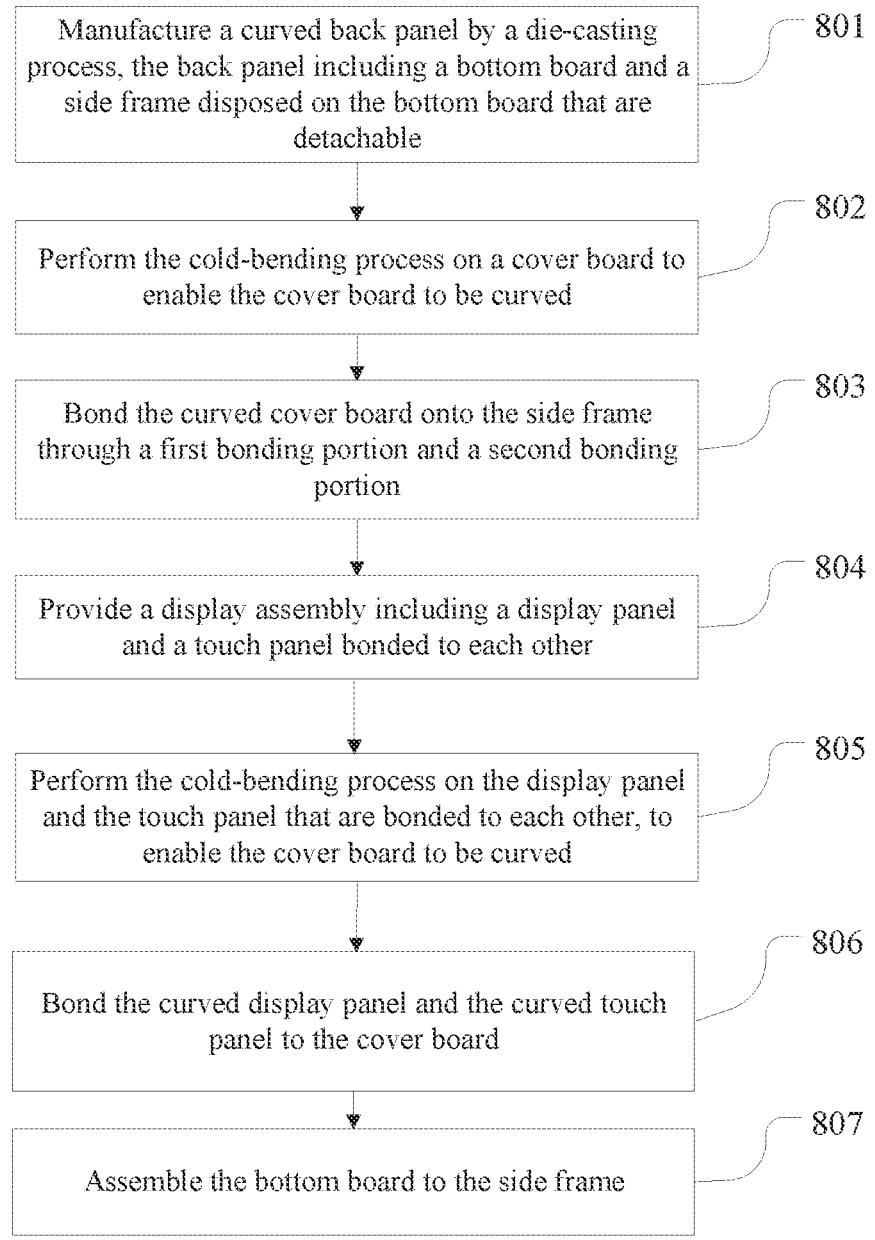
FIG. 8 shows a flowchart of a method of manufacturing a display module provided by other embodiments of the present disclosure.

FIG. 8 shows a flowchart of a manufacturing method of a display module according to other embodiments of the present disclosure. The manufacturing method of the curved display module 1 may include the following steps.

in step 801, a die-casting process is adopted to manufacture a curved back panel, and the back panel includes a bottom board and a side frame disposed on the bottom board that are detachable;

in step 802, a cold-bending process is performed on the cover board to enable the cover board to be curved;

in step 803, the curved cover board is bonded to the side frame through a first bonding portion and a second bonding portion;

in step 804, a display assembly is provided, and the display assembly including a display panel and a touch panel bonded to each other;

in step 805, the cold-bending process is performed on the display panel and the touch panel that are bonded to each other to enable the cover board to be curved;

in step 806: the curved display panel and the curved touch panel are bonded to the cover board; and in step 807, the bottom board is assembled to the side frame.

In step 801, the curved back panel 10 is manufactured by using the die-casting process, and the bottom board 101 and the side frame 102 of the back panel 10 are separate structures, for example, and the two may be manufactured by the die-casting process, respectively.

In step 802, a clamp is used to perform the cold-bending process on the cover board 12 to enable the cover board 12 to be curved, and a curvature of the cover board 12 matches that of the back panel 10.

In step 803, the first bonding portion 130 and the second bonding portion 131 are used to bond the curved cover board 13 to the side frame 102 of the back panel 10, and the elasticity modulus of the second bonding portion 131 is smaller than that of the first bonding portion 130.

In step 804, the optical glue 112 is used to bond the display panel 110 and the touch panel 111 in a flat state into an integral structure to form a second flat panel structure.

In step 805, a clamp is used to perform the cold-bending process on the second flat panel structure, to enable the second flat panel structure to be curved, and a curvature of the second flat panel structure matches that of the cover board 12.

In step 806, the curved second flat panel structure is bonded to the curved cover board 12 by using the optical glue 112, where the touch panel 111 is located between the display panel 110 and the cover board 12.

In step 807, the bottom board 101 is fixed to the side frame 102 by using a fastener 104.

Those skilled in the art can understand that the steps of the foregoing embodiments may be adjusted in order according to actual needs.

The embodiments of the present disclosure also provide a display apparatus, which includes the display module 1 described in any of the foregoing embodiments. The display apparatus may be a vehicle-mounted instrument, a central control display device, etc., but is not limited thereto.

In the present disclosure, the terms "one", "a", "the" and "said" are used to indicate that there are one or more elements/components or the like; the terms "include" and "have" are used to indicate an open meaning of including and means that there may be additional elements/components/etc. in addition to the listed elements/components/etc.; the terms "first" and "second" etc. are used only as markers, and do not limit the number of objects.

Other embodiments of the present disclosure will be apparent to those skilled in the art from consideration of the specification and practice of the present disclosure disclosed herein. The present application is intended to cover any variations, uses, or adaptations of the present disclosure, which are in accordance with the general principles of the present disclosure and include common general knowledge or conventional technical means in the art that are not disclosed in the present disclosure. The specification and embodiments are illustrative, and the real scope and spirit of the present disclosure is defined by the appended claims.

What is claimed is:

1. A display module, comprising:
 a curved back panel comprising a bottom board and a side frame disposed on the bottom board;
 a display assembly located in an accommodation space enclosed by the side frame and the bottom board;
 a cover board located on a side of the display assembly away from the bottom board and supported by the side frame; and
 a bonding layer comprising a first bonding portion and a second bonding portion located between the cover board and the side frame,
 wherein the first bonding portion and the second bonding portion are both configured to bond the cover board to the side frame to enable the cover board to be curved, and
 wherein an elasticity modulus of the second bonding portion is smaller than the elasticity modulus of the first bonding portion.

2. The display module according to claim 1, wherein:
 the first bonding portion comprises first solid glue and second solid glue disposed on the side frame, and the first solid glue and the second solid glue both are configured to extend along a circumferential direction of the cover board, and the first solid glue, the second solid glue and the side frame are configured to enclose an accommodation cavity; and
 the second bonding portion comprises liquid glue, and the liquid glue is filled in the accommodation cavity.

3. The display module according to claim 2, wherein the first solid glue and the second solid glue are spaced apart, the first solid glue is closer to an outer wall surface of the side frame than the second solid glue, and the second solid glue is closer to an inner wall surface of the side frame than the first solid glue.

4. The display module according to claim 3, wherein both the first solid glue and the second solid glue are in a ring shape, and the first solid glue is configured to surround the second solid glue.

5. The display module according to claim 2, wherein a surface of the side frame in contact with the liquid glue is provided with a groove.

6. The display module according to claim 2, wherein the first solid glue and the second solid glue are a substrate-free double sided adhesive, and the liquid glue is optical glue.

7. The display module according to claim 1, wherein the first bonding portion and the second bonding portion are both solid glue, the second bonding portion is disposed in a plurality of corner areas of the side frame, and the first bonding portion is disposed between any two adjacent corner areas and extends from one corner area of any two adjacent corner areas to the other corner area of the two adjacent corner areas.

8. The display module according to claim 7, wherein the first bonding portion is a substrate-free double sided adhesive, and the second bonding portion is a foam substrate double sided adhesive.

9. The display module according to claim 7, wherein an end of the first bonding portion close to the second bonding portion comprises a first bump protruding toward the second bonding portion, an end of the second bonding portion close to the first bonding portion comprises a second bump protruding toward the first bonding portion, and the first bump and the second bump are configured to abut against each other in a width direction of the first bonding portion.

10. The display module according to claim 1, wherein the display module is curved.

11. The display module according to claim 1, wherein the display assembly comprises a display panel and a touch panel bonded between the display panel and the cover board, and the display panel, the touch panel, and the cover board are all curved.

12. The display module according to claim 1, wherein a curvature of the curved back panel is the same as a curvature of the cover board.

13. The display module according to claim 1, wherein the side frame is detachably coupled to the bottom board.

14. A display apparatus, comprising:
 a display module, the display module comprising:
  a curved back panel comprising a bottom board and a side frame disposed on the bottom board;
  a display assembly located in an accommodation space enclosed by the side frame and the bottom board;
  a cover board located on a side of the display assembly away from the bottom board and supported by the side frame; and
  a bonding layer comprising a first bonding portion and a second bonding portion located between the cover board and the side frame, wherein the first bonding portion and the second bonding portion are both configured to bond the cover board to the side frame to enable the cover board to be curved, and wherein an elasticity modulus of the second bonding portion is smaller than the elasticity modulus of the first bonding portion.

15. The display apparatus according to claim 14, wherein:

the first bonding portion comprises first solid glue and second solid glue disposed on the side frame, the first solid glue and the second solid glue both are configured to extend along a circumferential direction of the cover board, and the first solid glue, the second solid glue, and the side frame are configured to enclose an accommodation cavity; and the second bonding portion comprises liquid glue, and the liquid glue is filled in the accommodation cavity.

16. The display apparatus according to claim 14, wherein the first bonding portion and the second bonding portion are both solid glue, the second bonding portion is disposed in a plurality of corner areas of the side frame, and the first bonding portion is disposed between any two adjacent corner areas and extends from one corner area of any two adjacent corner areas to the other corner area of the two adjacent corner areas.

17. The display apparatus according to claim 14, wherein the display assembly comprises a display panel and a touch panel bonded between the display panel and the cover board, and the display panel, the touch panel, and the cover board are all curved.

18. A method of manufacturing a display module, comprising:

manufacturing a curved back panel through a die-casting process, wherein the curved back panel comprises a bottom board and a side frame disposed on the bottom board;

performing a cold-bending process on a cover board to make a curved cover board;

bonding the curved cover board to the side frame through a first bonding portion and a second bonding portion, wherein an elasticity modulus of the second bonding portion is smaller than the elasticity modulus of the first bonding portion; and providing a display assembly, wherein the display assembly comprises a display panel and a touch panel bonded to each other, wherein, before the bonding the curved cover board to the side frame through the first bonding portion and the second bonding portion, the method of manufacturing the display module further comprises:

bonding the display panel and the touch panel bonded to each other to the cover board, wherein the touch panel is located between the display panel and the cover board, and the cold-bending process is performed on the display panel, the touch panel and the cover board that are bonded together, to enable all of the display panel, the touch panel and the cover board to be curved; or performing the cold-bending process on the display panel and the touch panel that are bonded to each other to enable both of the display panel and the touch panel to be curved, and bonding the display panel and the touch panel as curved to the cover board, wherein the touch panel is located between the display panel and the cover board.

* * * * *